United States Patent
Kumar et al.

(10) Patent No.: US 9,564,942 B2
(45) Date of Patent: Feb. 7, 2017

(54) PICTURE CHANGING ASSEMBLY FOR MOBILE PHONE CASES

(71) Applicant: Skiva Technologies, Inc., Irving, TX (US)

(72) Inventors: Mandeep Kumar, Irving, TX (US); Pratham Shah, Irving, TX (US)

(73) Assignee: SKIVA TECHNOLOGIES, INC., Irving, TX (US)

( * ) Notice: Subject to any disclaimer, the term of this patent is extended or adjusted under 35 U.S.C. 154(b) by 2 days.

(21) Appl. No.: 14/532,575

(22) Filed: Nov. 4, 2014

(65) Prior Publication Data

US 2016/0127000 A1    May 5, 2016

(51) Int. Cl.
*H04M 1/00*    (2006.01)
*H04B 1/3888*    (2015.01)

(52) U.S. Cl.
CPC .................................. *H04B 1/3888* (2013.01)

(58) Field of Classification Search
CPC ......... H04B 1/3888; G09F 11/15; G09F 23/00
USPC ........... 455/575.1, 90.3, 550.1, 575.8, 575.4
See application file for complete search history.

(56) References Cited

U.S. PATENT DOCUMENTS

| | | | |
|---|---|---|---|
| 3,752,297 A | 8/1973 | Lemaresquier | |
| 7,434,680 B2 | 10/2008 | Kitamura | |
| 8,702,097 B2 * | 4/2014 | Yamaguchi | 198/806 |
| 8,879,994 B2 * | 11/2014 | Brown | H04N 1/00347 455/41.2 |
| 8,985,312 B2 * | 3/2015 | Osborn | B65G 15/34 198/502.1 |
| 9,114,643 B2 * | 8/2015 | Yasumoto | B41J 11/007 |
| 9,185,735 B2 * | 11/2015 | Brown | H04N 1/00347 |
| 9,195,178 B2 * | 11/2015 | Kosasa | G03G 15/1615 |
| 2004/0202095 A1 * | 10/2004 | Shin | H02K 3/26 369/264 |
| 2010/0097443 A1 * | 4/2010 | Lablans | G03B 37/00 348/36 |
| 2010/0123666 A1 * | 5/2010 | Wickholm | H04M 1/0283 345/173 |
| 2012/0307176 A1 * | 12/2012 | Tanaka | G02F 1/1343 349/61 |
| 2013/0175143 A1 | 7/2013 | Osborn et al. | |
| 2013/0327616 A1 | 12/2013 | Meggelaars et al. | |
| 2014/0065948 A1 * | 3/2014 | Huang | H05K 5/0086 455/7 |
| 2014/0116895 A1 * | 5/2014 | Ellenburg | H04B 1/3888 206/37 |

(Continued)

FOREIGN PATENT DOCUMENTS

EP    1439138    7/2004

*Primary Examiner* — Marceau Milord

(57) ABSTRACT

An apparatus is provided in one example embodiment and includes a motor, a first endless belt encircling a first pair of spaced apart shafts, a second endless belt encircling a second pair of spaced apart shafts, a drive element connecting the motor to one shaft each of the first pair of shafts and the second pair of shafts, and a continuous strip of film having a first end and a second end attached to the first endless belt and the second endless belt respectively. The motor activates the drive element to rotate one shaft each of the first pair of shafts and the second pair of shafts causing the belts to rotate, unwinding the film from the first endless belt and winding it on the second endless belt.

12 Claims, 10 Drawing Sheets

(56) References Cited

U.S. PATENT DOCUMENTS

| | | | | |
|---|---|---|---|---|
| 2014/0162729 A1* | 6/2014 | Garden | ............... | H04B 1/3888 |
| | | | | 455/566 |
| 2014/0217866 A1* | 8/2014 | Harris | ................... | A45C 11/00 |
| | | | | 312/226 |
| 2015/0015462 A1* | 1/2015 | Lee | ................... | H04N 13/0402 |
| | | | | 345/32 |
| 2015/0189051 A1* | 7/2015 | Umehara | ............ | H04M 1/0202 |
| | | | | 455/566 |
| 2015/0270862 A1* | 9/2015 | Harris | ................ | H04B 1/3888 |
| | | | | 224/576 |
| 2015/0365508 A1* | 12/2015 | Kwon | ................. | H04B 1/3888 |
| | | | | 455/566 |
| 2016/0044148 A1* | 2/2016 | Pizzo | .................. | H04M 1/026 |
| | | | | 455/575.8 |
| 2016/0056855 A1* | 2/2016 | Berger | ................ | H04B 1/3888 |
| | | | | 455/575.8 |

* cited by examiner

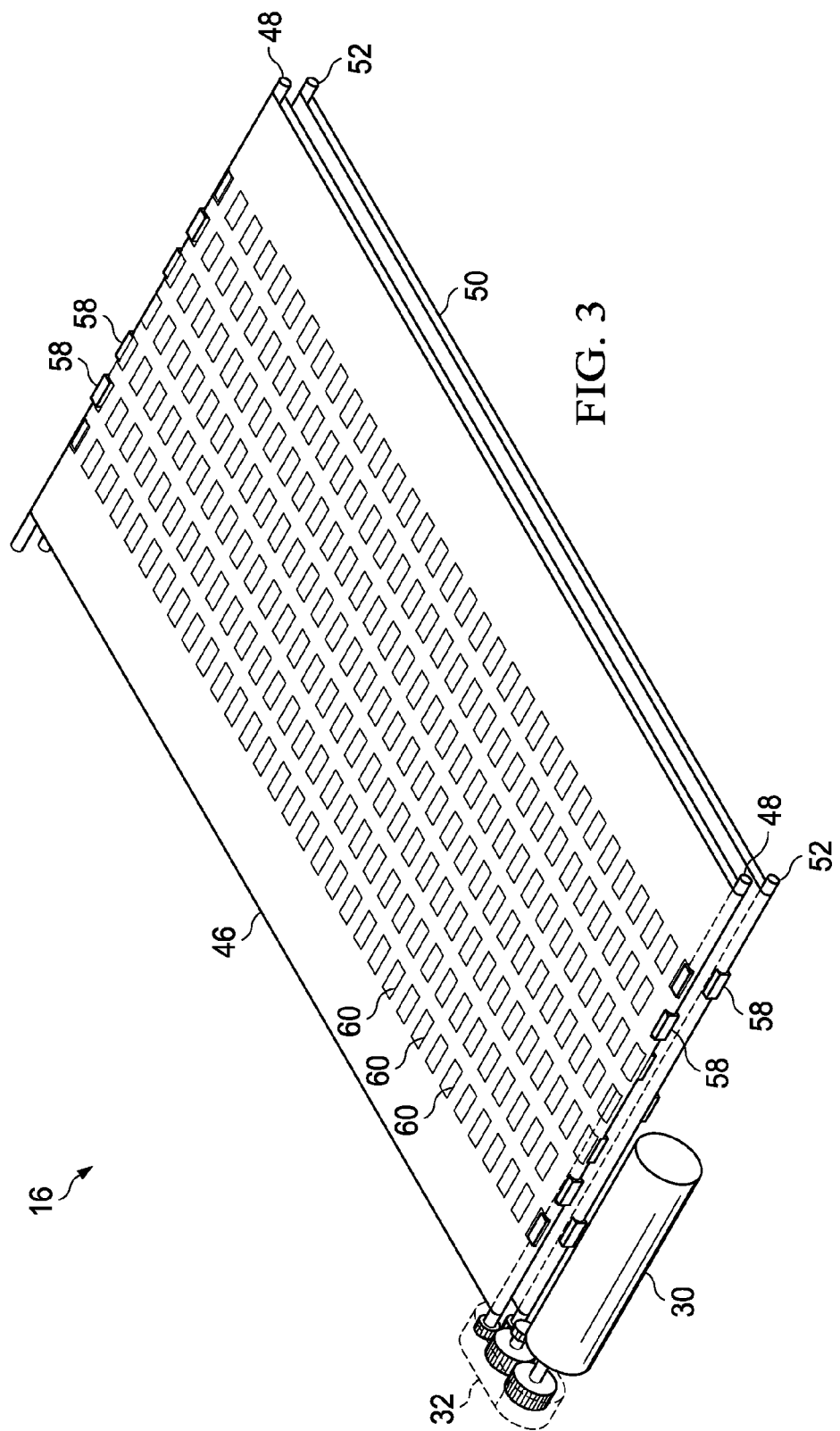

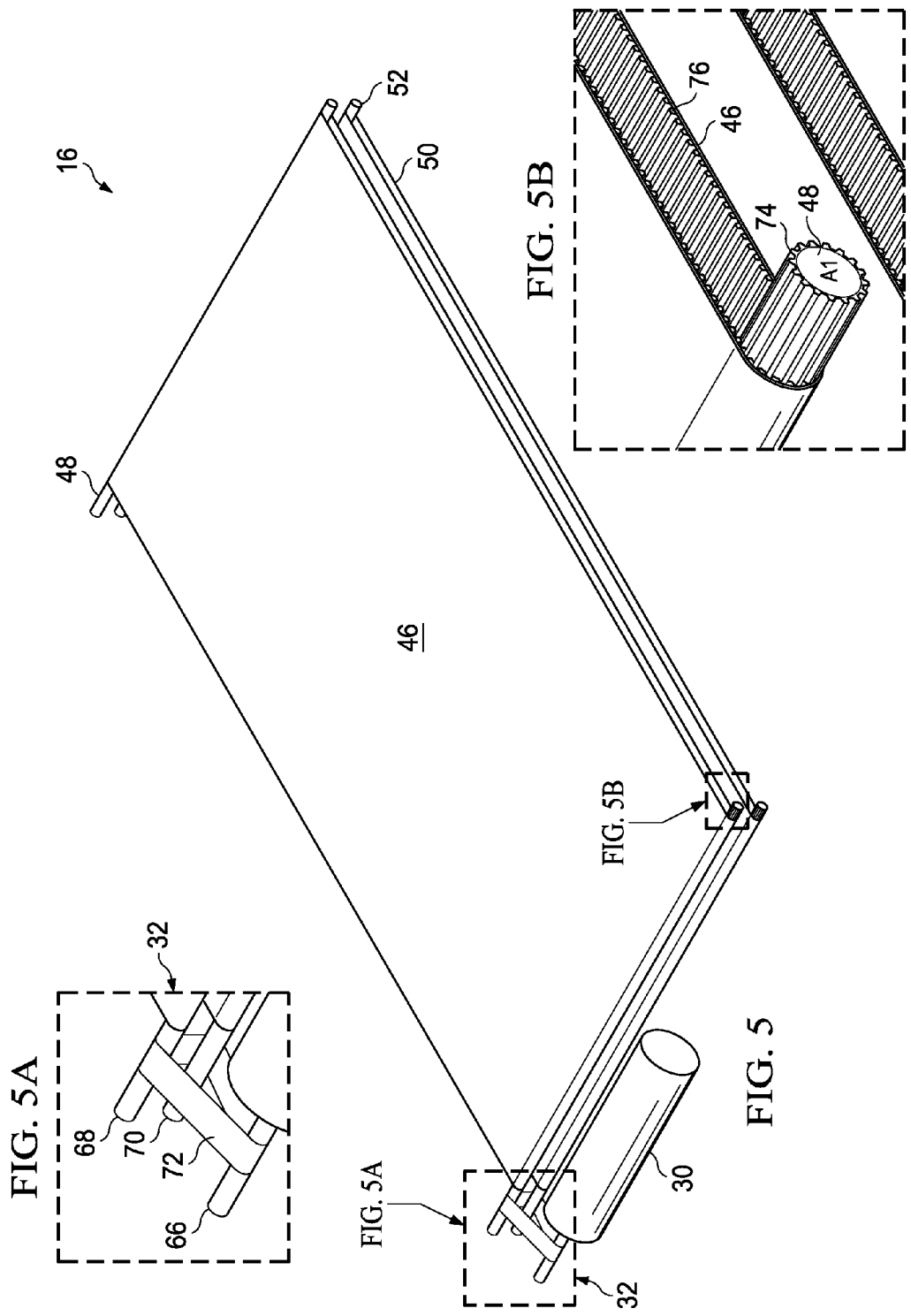

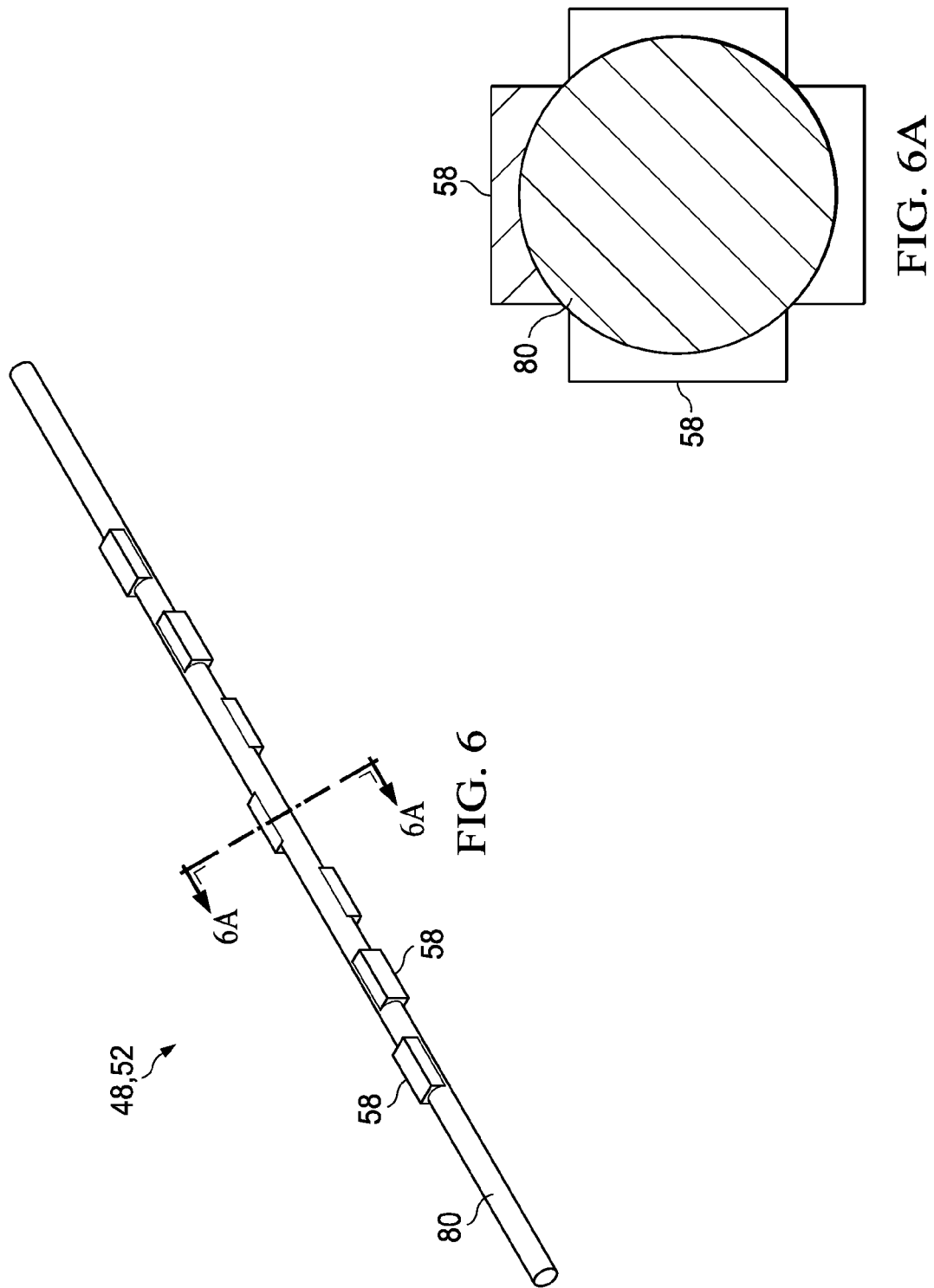

PICTURE CHANGING ASSEMBLY FOR MOBILE PHONE CASES

TECHNICAL FIELD

This disclosure relates in general to conveyor systems and, more particularly, to a picture changing assembly for mobile phone cases.

BACKGROUND

Mobile phones and cases (e.g., covers) for mobile phones are well known in the communications industry. Different types of mobile phone cases are available in the market. Some mobile phone cases are non-customizable; some others are customizable with particular designs or pictures, according to customer specifications, imprinted on the case.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified diagram illustrating yet other example details associated with an example embodiment of the picture changing assembly;

FIG. 5 is a simplified diagram illustrating yet other example details associated with an example embodiment of the picture changing assembly;

FIGS. 5A and 5B are simplified diagrams illustrating yet other example details associated with an example embodiment of the picture changing assembly;

FIG. 6 is a simplified diagram illustrating yet other example details associated with an example embodiment of the picture changing assembly;

FIG. 6A is a simplified cross-section diagram illustrating yet other example details associated with an example embodiment of the picture changing assembly;

DETAILED DESCRIPTION OF EXAMPLE EMBODIMENTS

Overview

An apparatus is provided in one example embodiment and includes a motor, a first endless belt encircling a first pair of spaced apart shafts, a second endless belt encircling a second pair of spaced apart shafts, a drive element connecting the motor to one shaft each of the first pair of shafts and the second pair of shafts, and a continuous strip of film having a first end and a second end attached to the first endless belt and the second endless belt, respectively. The motor activates (e.g., triggers, starts, actuates, etc.) the drive element to rotate one shaft each of the first pair of shafts and the second pair of shafts causing the belts to rotate, unwinding the film from the first endless belt and winding it on the second endless belt.

Example Embodiments

Figure 1A:
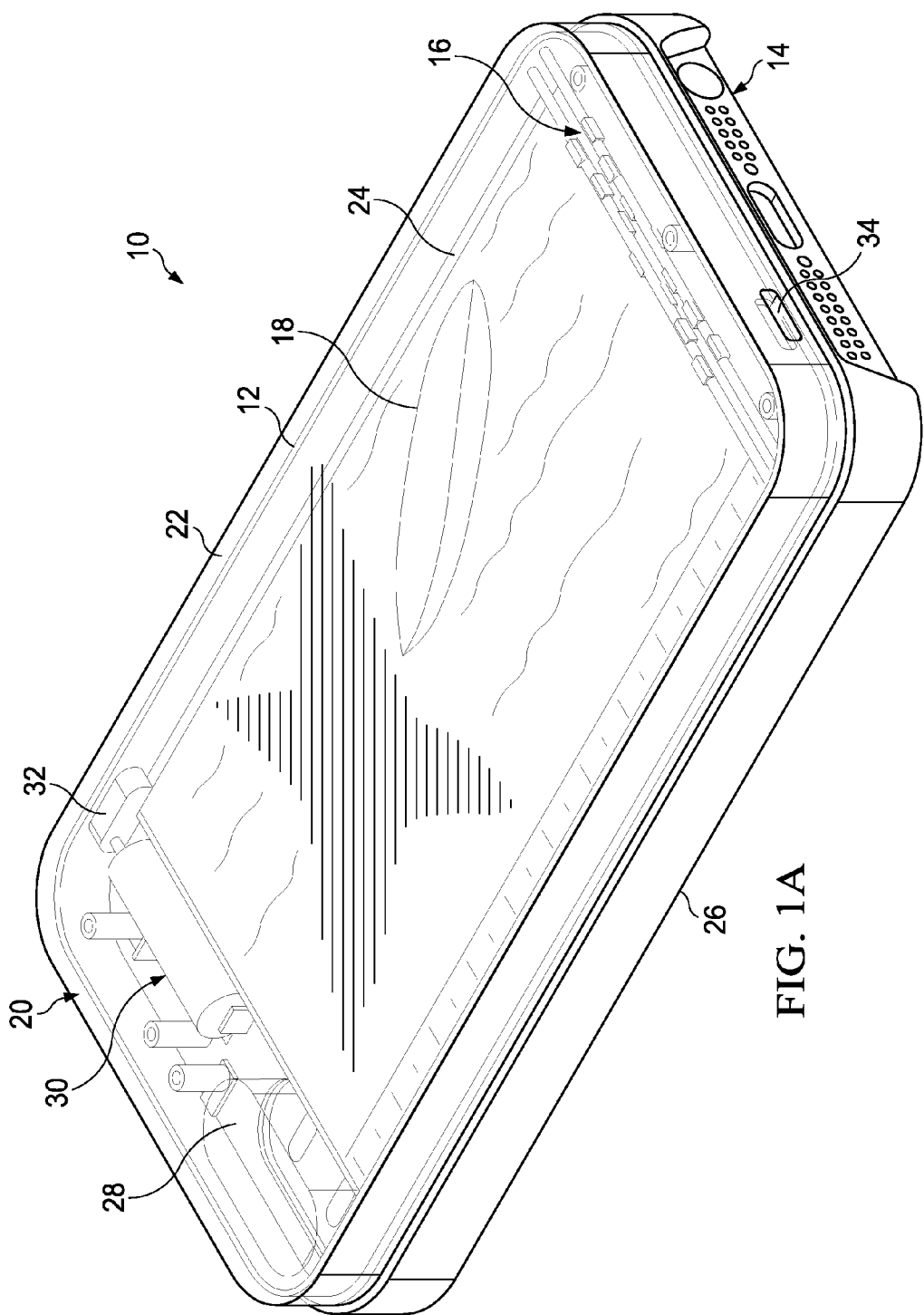
FIG. 1A is a simplified diagram illustrating a mobile phone case according to an example embodiment.
Figure 1B:
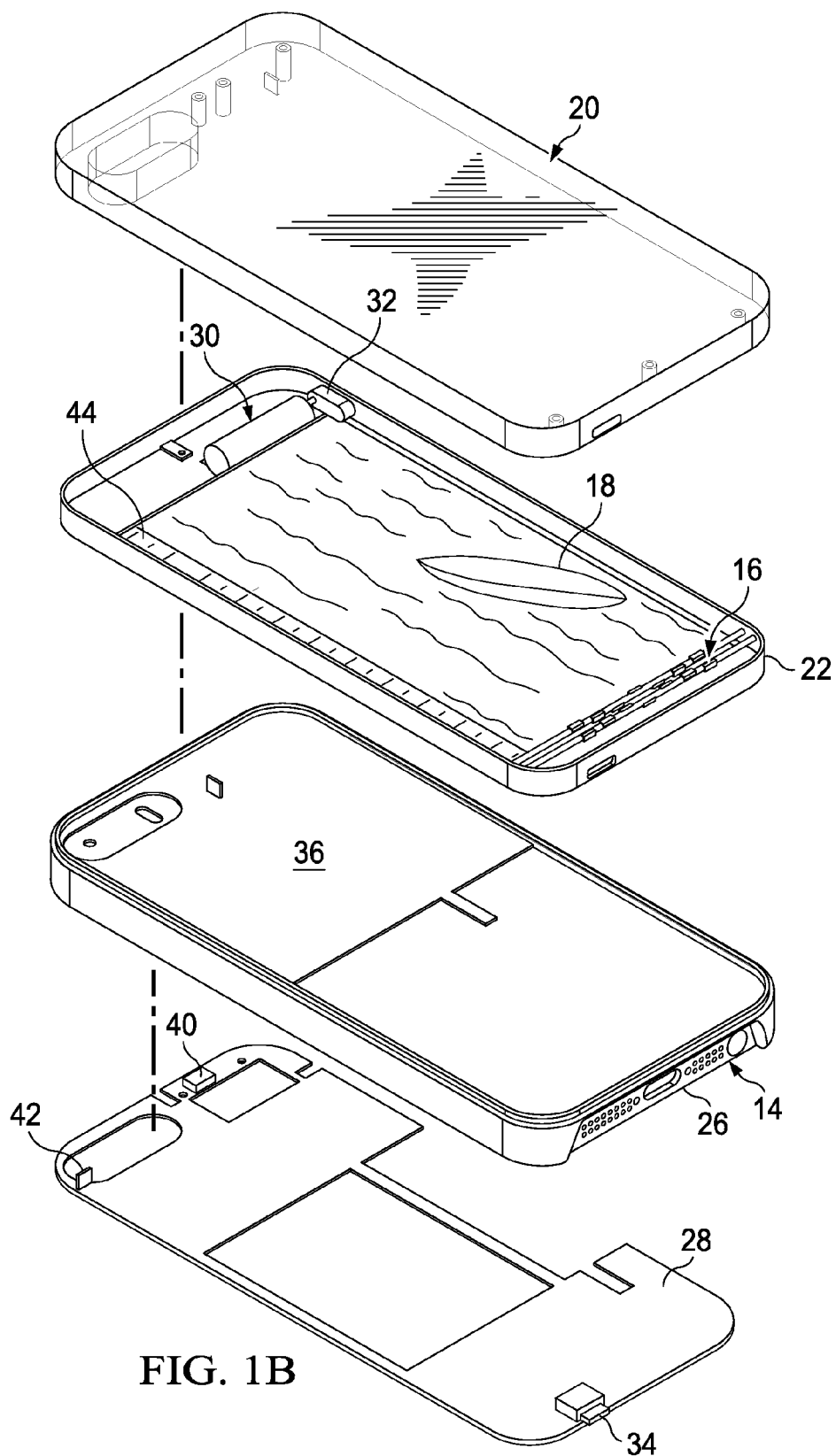
FIG. 1B is a simplified diagram illustrating an exploded view of the mobile phone case in accordance with the example embodiment.

Turning to FIGS. 1A and 1B, FIG. 1A is a simplified block diagram illustrating a system 10 comprising a mobile phone case 12 according to an example embodiment. FIG. 1B is a simplified block diagram illustrating an exploded view of system 10 according to the example embodiment. System 10 includes a mobile phone 14 (e.g., cell phone, iPad®, e-reader, etc.) that fits snugly into mobile phone case 12. In various embodiments, mobile phone case 12 may provide mechanical protection to mobile phone 14. Mobile phone case 12 comprises a picture changing assembly 16 configured to display a picture 18 on a transparent portion 20 of a case top 22. Transparent portion 20 is sized to display picture 18 underneath it, picture 18 being one of a plurality of similar sized pictures imprinted on a continuous strip of film 24. "Film" refers to a relatively thin and flexible strip of material; it can be opaque, transparent, or translucent within the broad scope of the embodiments. Mobile phone case 12 includes a case bottom 26 configured to fit mobile phone 14. In various embodiments, mobile phone 14 may fit snugly into case bottom 26, similar to conventional mobile phone cases. A printed circuit board 28 is disposed within mobile phone case 12 to enable picture changing assembly 16 to function appropriately. According to various embodiments, picture changing assembly 16 comprises a motor 30 and a drive element 32 configured to cause movement of film 24, enabling picture 18 to be positioned under transparent portion 20. A micro universal serial bus (USB) port 34 is provided in mobile phone case 12, attached to PCB 28, to charge a battery 36 that can power picture changing assembly 16.

PCB 28 may also include a wireless controller 40 (e.g., Bluetooth® controller, or other such device capable of generating instructions to remotely and wirelessly control electronic and/or electrical components) and a bar code sensor 42, which may be configured to read a bar code 44 associated with each picture 18 on film 22. In some embodiments, bar code 44 may be printed on an edge of film 24 to proximate corresponding picture 18. Bar code sensor 42 may sense (e.g., read) bar code 44 when corresponding picture 18 is positioned underneath transparent portion 20 such that picture 18 is visible from outside mobile phone case 12. In other embodiments, bar code 44 may comprise a digital fingerprint imprinted into picture 18, and bar code sensor 42 may be configured to sense (e.g., read) and interpret the digital fingerprint. Any suitable identifier may be used as bar code 44 to identify picture 18; and bar code sensor 42 may be correspondingly configured to read and interpret bar code 44 to identify picture 18 positioned underneath the transparent portion 20.

Wireless controller 40 may be configured to receive signals from bar code sensor 42 identifying picture 18. In some embodiments, if identified picture 18 is a desired (e.g., selected) picture, according to instructions received wirelessly from an application executing on mobile phone 14, wireless controller 40 may cause motor 30 to stop, freezing picture 18 underneath transparent portion 20. On the other hand, if identified picture 18 is not the selected picture, wireless controller 40 may activate motor 30 (e.g., if motor 30 was in a deactivated status) facilitating picture changing assembly to change picture 18 to the next adjacent picture on film 24.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of system 10. It should be understood that the system 10 shown in FIG. 1 is simplified for ease of illustration.

Figure 2:
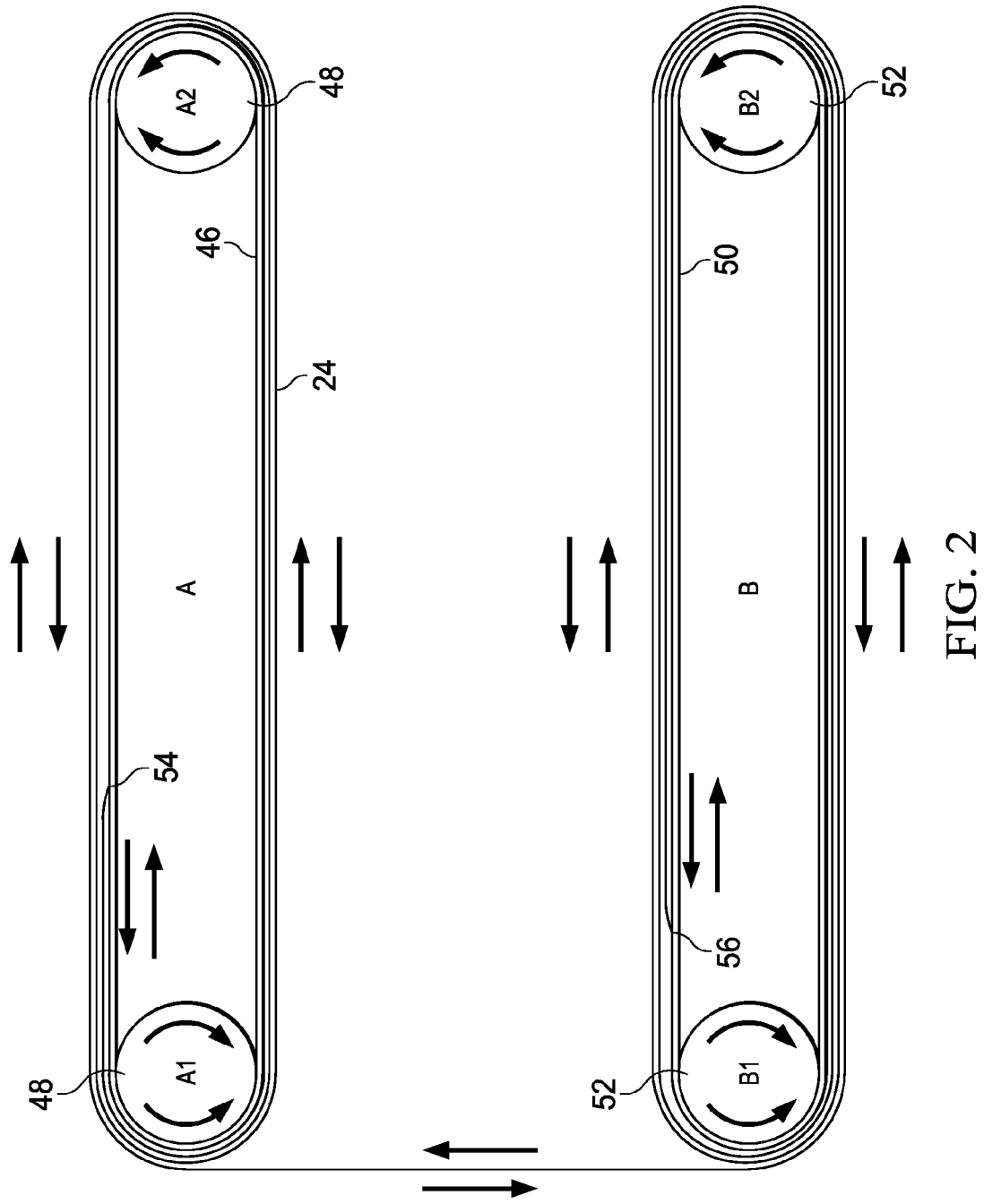
FIG. 2 is a simplified diagram illustrating example details associated with an example embodiment of a picture changing assembly for the mobile phone case.

Turning to FIG. 2, FIG. 2 is a simplified block diagram illustrating example details of picture changing assembly 16 according to an example embodiment. Picture changing assembly 16 may include motor 30; a first endless belt 46 encircling a first pair of spaced apart shafts 48 (e.g., A1, A2); a second endless belt 50 encircling a second pair of spaced apart shafts 52 (e.g., B1, B2); drive element 32 connecting motor 30 to one shaft each (e.g., A1 and B1) of first pair of shafts 48 and second pair of shafts 52; and continuous strip of film 24 having a first end 54 and a second end 56 attached to first endless belt 46 and second endless belt 50, respectively.

First endless belt 46 may be trained between spaced shafts 48, one of which (e.g., A1) is driven by motor 30 and the other (e.g., A2) may perform a tensioning role, engaging first endless belt 46 with a predetermined tension in the belt. The two shafts (e.g., A1 and A2) are spread apart to define termini of turns of first endless belt 46. As shafts 48 (e.g., A1 and A2) rotate, endless belt 46 is forced to move, causing a portion between shafts 48 to translate, and the portions on shafts 48 to rotate. Likewise, second endless belt 50 may be trained between spaced shafts 52, one of which (e.g., B1) is driven by motor 30 and the other (e.g., B2) may perform a tensioning role, engaging second endless belt 50 with a predetermined tension in the belt. The two shafts (e.g., B1 and B2) are spread apart to define termini of turns of second endless belt 50. As shafts 52 (e.g., B1 and B2) rotate, endless belt 50 is forced to move, causing a portion between shafts 52 to translate, and the portions on shafts 52 to rotate.

Film 24 is wound around belts 46 and 50, with a portion wound around belt 46 and another portion wound around belt 50. In some embodiments, multiple windings of film 24 may be made around belts 46 and 50. For example, first end 54 of film 24 may be stuck to first endless belt 46; second end of film 24 may be stuck to second endless belt 50. Film 24 may be wound along belts 46 and 50 multiple times. In the embodiment shown in the figure, first pair of shafts 48 may be disposed parallel to and above second pair of shafts 52, with a vertical spacing between them. Belts 46 and 50 may rotate parallel to each other, one above the other during operation.

During operation, motor 30 activates drive element 32 to rotate one shaft each (e.g., A1 and B1) of first pair of shafts 48 and second pair of shafts 50. The rotation of the shafts (e.g., A1 and B1) cause first endless belt 46 and second endless belt 50 to rotate around first pair of shafts 48 and second pair of shafts 52, respectively, unwinding film 24 from first endless belt 46 and winding it on second endless belt 50. Assume, merely for example purposes, and not as a limitation, that as belts 46 and 50 rotate clockwise, film 24 is wound on belt 46 and unwound from belt 50; as belts 46 and 50 rotate counter-clockwise, film 24 is wound on belt 50 and unwound from belt 46. As film winds 24 (or unwinds), a portion of film 24 corresponding to picture 18 will be positioned underneath transparent portion 20 of case top 22 and displayed to a user.

In some embodiments, when picture changing assembly 16 is activated, film 24 may continuously move over belts 46 and 50, changing display picture 18 under transparent portion 20 of mobile phone case 12. When an end of film 24 is reached, motor 30 may cause rotation of shafts in the opposite direction. The process may continue until picture changing assembly 16 is deactivated. In other embodiments, the user can switch pictures on film 24 using an application executing in mobile phone 14. For example, the application may send appropriate instructions to wireless controller 40, causing it to activate or deactivate motor 30, until a selected picture 18 is positioned underneath transparent portion 20 of case top 22.

Turning to FIG. 3, FIG. 3 is a simplified diagram illustrating example details of picture changing assembly 16 according to an example embodiment of system 10. Shafts 48 (e.g., A1, A2) and 52 (e.g., B1, B2) include teeth 58 on their surfaces. Teeth 58 may be fabricated at different cross sections along the length of each shaft. In other words, teeth 58 may be spaced apart from each other along the length of each shaft. Also, teeth 58 may be located at different angles relative to the immediate adjacent tooth along the circumference of each shaft. For example, assuming that each shaft includes 4 teeth 58, each tooth may be at 90° relative to the immediately adjacent teeth.

Belts 46 and 50 include corresponding holes 60 that can mate with teeth 58 along areas of contact between belts 46 and 50 and respective shafts 48 and 52. Holes 60 may be spaced apart along the length of each belt (e.g., perpendicular to shafts 48 and 52) and along the width of each belt (e.g., parallel to shafts 48 and 52). In some embodiments, teeth 58 and holes 60 may be disposed only along edges of the shafts and belts, respectively. Note that there is a tradeoff between the number of holes and strength (e.g., load bearing capacity, fatigue strength, resistance to tearing, etc.) of the belts; higher the number of holes 60, lower is the strength of the corresponding belts. Note that the spacing between holes 60 along the width of each belt corresponds to spacing between teeth 58 along the length of each shaft. In some embodiments, the spacing and number of teeth 58 and holes 60 may be same for both shaft/belt pair (e.g., shafts 48 and belt 46 may comprise one shaft/belt pair; shafts 52 and belt 50 may comprise another shaft/belt pair); in other embodiments, each shaft/belt pair may have relatively different number of teeth 58 and corresponding holes 60 (e.g., shaft 48 may have 10 teeth and belt 46 may have 100 holes; shaft 52 may have 20 teeth and belt 50 may have 200 holes; etc.).

During operation, as shafts 48 and 52 rotate, teeth 58 mate with holes 60 along areas of contact between the shafts and belts, forcing belts 46 and 50 to rotate with shafts 48 and 52, respectively. In some embodiments, drive element 32 can comprise a gear drive, comprising a gear wheel attached to motor 30 that mates with two other gear wheels connected to shafts 48 and 52, respectively. When motor 30 causes the attached gear wheel to rotate, the rotation is propagated to the mating gear wheels, which in turn cause shafts 48 and 52 to rotate.

Figure 4A:
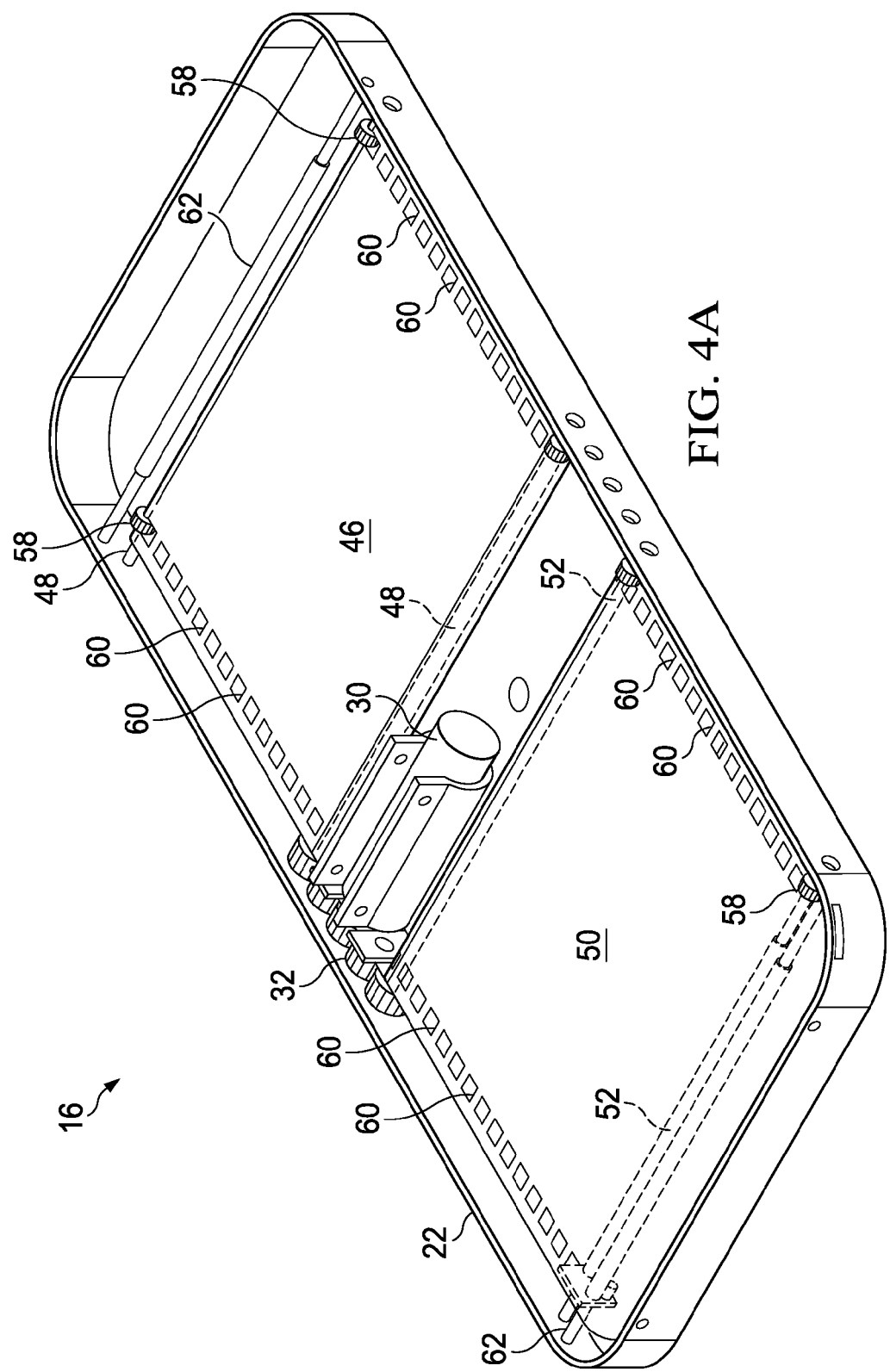
FIGS. 4A and 4B are simplified diagrams illustrating other example details of the picture changing assembly case in accordance with an embodiment.
Figure 4B:
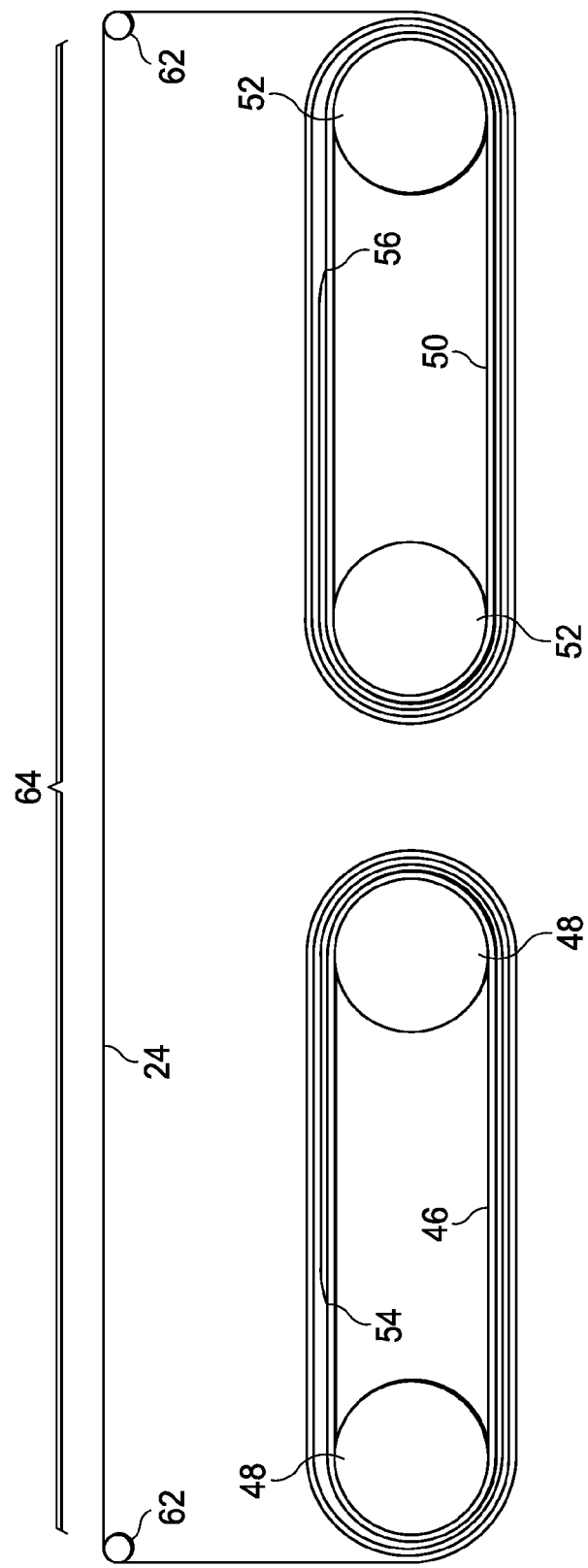

Turning to FIGS. 4A and 4B, FIGS. 4A and 4B are simplified diagrams illustrating example details of picture changing assembly 16 according to another example embodiment of system 10. Case 22 may house picture changing assembly 16 comprising motor 30, drive element 32, first never ending belt 46 wound around first pair of shafts 48, and second never ending belt 50 wound around second pair of shafts 52. According to the embodiment shown in the figures, first pair of shafts 48 may be disposed parallel to and beside second pair of shafts 52, with a horizontal spacing between them Motor 30 and drive element 32 may be located in the horizontal spacing between first pair of shafts 48 and second pair of shafts 52. In some embodiments, belts 46 and 50 may include holes 60 (e.g., located along edges of respective belts in some embodiments; spread out over the belt surface in other embodiments). Holes 60 may mate with corresponding teeth 58 on shafts 48 and 52. Two rods 62 may be located to proximate transparent portion 20 of case top 22. In such embodiments, because there is little to no vertical spacing between pairs of shafts 48 and 52, the overall thickness of case top 22 can be smaller relative to embodiments in which pairs of shafts 48 and 52 are disposed vertically, one over the other.

Referring to FIG. 4B, first end 54 of film 24 may be attached to first never ending belt 46 and a portion of film 24 wound around belt 46. Second end 56 of film 24 may be attached to second never ending belt 50 and another portion of film 24 wound around belt 50. Yet another portion 64 of film 24 may be wound over shafts 62. During operation, as belts 46 and 50 rotate, film 24 is unwound from belt 46 and wound onto belt 50. Portion 64 of film 24 between shafts 62 may include selected picture 18, which may be displayed through transparent portion 20 of mobile phone case 12.

Turning to FIG. 5, FIG. 5 is a simplified diagram showing example details of an embodiment of picture changing assembly 16. In some embodiments, drive element 32 may comprise a friction belt drive, as indicated in FIG. 5A. For example, friction belt drive element 32 may include three shafts: shaft 66 connected to motor 30; another shaft 68 connected to, or comprising a portion of one of first pair of shafts 48; yet another shaft 70 connected to, or comprising a portion of one of second pair of shafts 52. Shaft 66, 68 and 70 may be coupled together with a belt 72. During operation, when motor 30 is activated, the directly attached shaft 66 may rotate. Frictional forces between shaft 66 and belt 72 may cause belt 72 to rotate. Frictional forces between belt 72 and shafts 68 and 70 may cause shafts 68 and 70 to rotate, thereby causing belts 46 and 50 to rotate.

In some embodiments, first pair of shafts 48 and second pair of shafts 52 may comprise toothed belt drives including teeth on the shafts that mate with corresponding teeth on the respective belts. A portion of the toothed belt drive is shown in greater detail in FIG. 5B. Shaft A1 of first pair of shafts 48 may include teeth 74 (e.g., similar to gear teeth). Belt 46 may include corresponding teeth 76 that can mate with teeth 74. During operation, as shaft A1 rotates, mating teeth 74 and 76 can cause belt 46 to move with shaft A1. A similar mechanism may operate with belt 50 and second pair of shafts 52.

Thus, in various embodiments, different combinations of drive element 32 and drive options of shaft/belt pairs may be used. In one example embodiment, drive element 32 may comprise a gear drive, and shafts 48 and 52 may comprise toothed shafts that mate with holes on belts 46 and 50, respectively. In another example embodiment, drive element 32 may comprise a gear drive, and shafts 48 and 52, and belts 46 and 50 may comprise a toothed belt drive with mating teeth on both shafts and belts. In yet another embodiment, drive element 32 may comprise a friction belt drive, and shafts 48 and 52 may comprise toothed shafts that mate with holes on belts 46 and 50, respectively. In yet another embodiment, drive element 32 may comprise a friction belt drive, and shafts 48 and 52, and belts 46 and 50 may comprise a toothed belt drive with mating teeth on both shafts and belts.

Turning to FIGS. 6 and 6A, FIG. 6 is a simplified diagram illustrating example details of an example shaft 80 in first and second pair of shafts 48 and 52 according to an example embodiment. Example shaft 80 may be one of first pair of shafts 48 and/or second pair of shafts 52. Example shaft 80 may include teeth 58 attached thereto. Teeth 58 may be spaced apart from each other, with a relative angle between any two adjacent teeth. A cross sectional view of example shaft 80 is shown in greater detail in FIG. 6A. Assume, merely for example purposes, that the relative angle between adjacent teeth is 90°.

During operation, a particular tooth 58 hooks a corresponding hole 60 in the respective belt (e.g., 46 or 50) and pulls it along as shaft 80 rotates. Past a 90° angle of rotation, hole 60 may be disengaged from particular tooth 58; however, other teeth 58 along shaft 80 may engage with other holes in the belt, pulling the belt along in the direction of the shaft 80's rotation.

Figure 7:
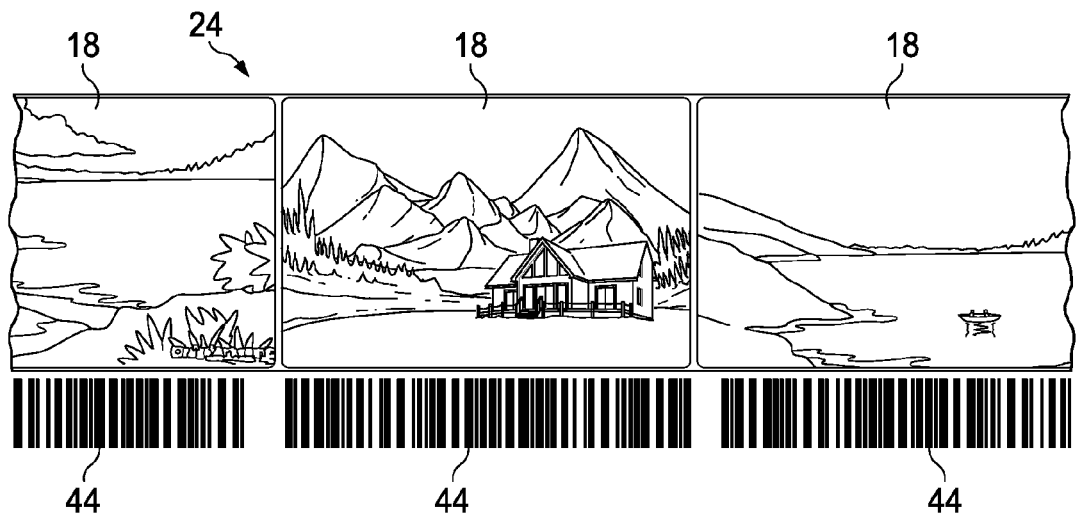
FIG. 7 is a simplified diagram illustrating yet other example details associated with an example embodiment of the picture changing assembly.

Turning to FIG. 7. FIG. 7 is a simplified diagram illustrating an example configuration of pictures on film 24 according to an embodiment. A plurality of pictures 18 may be imprinted on film 24. Each picture 18 may have a corresponding bar code 44 associated therewith. The picture and the bar code may have a one-to-one correspondence; thus any one bar code may uniquely correspond to a particular picture. In some embodiments, several (e.g., 64) pictures may be imprinted on film 24.

Figure 8:
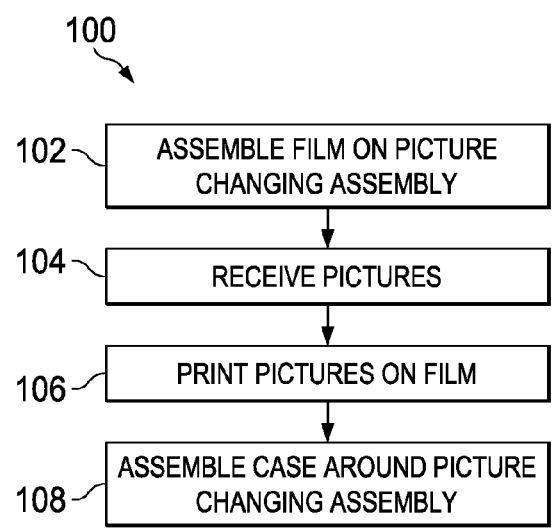
FIG. 8 is a simplified flow diagram illustrating example operations that may be associated with an embodiment of the picture changing assembly for mobile phone cases.

Turning to FIG. 8, FIG. 8 is a simplified flow diagram illustrating example operations 100 that may be associated with embodiments of system 10. At 102, film 24 may be assembled on picture changing assembly 16. For example, first end 54 of film 24 may be attached to belt 46 (e.g., using glue, staples, etc.), and likewise, second end 56 of film 24 may be attached to belt 50. Film 24 may be partially wound over belt 46 and over 50. At 104, pictures to be imprinted on film 24 may be received (e.g., from customer). At 106, the pictures may be imprinted on film 24 using any suitable method (e.g., laser printing). At 108, mobile phone case 12 may be assembled around picture changing assembly 16. For example, picture changing assembly 16 may be placed in case top 22. Case top 22 may be integral with, or attached to case bottom 26. Transparent portion 20 of case top 22 may be snapped in (or otherwise attached) to case top 22.

Figure 9:
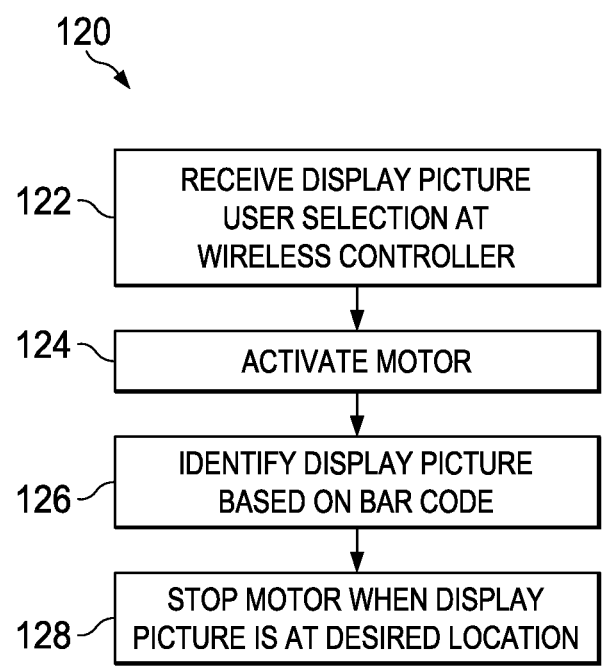
FIG. 9 is a simplified flow diagram illustrating other example operations that may be associated with an embodiment of the picture changing assembly for mobile phone cases.

Turning to FIG. 9, FIG. 9 is a simplified flow diagram illustrating example operations 120 that may be associated with embodiments of system 10. At 122, wireless controller 40 may receive display picture user selection (e.g., from an application executing in mobile phone 14). At 124, wireless controller 40 may activate motor 30. At 126, wireless controller 40 may receive signals from bar code sensor 42 and identify display picture based on bar code 44. At 128, wireless controller 40 may stop motor 30 when the selected display picture 18 is at desired location, underneath transparent portion 20 of case top 22.

Note that in various embodiments, the components described herein may be made of any suitable materials. For example, mobile phone case 12 may be made of hard plastic, with transparent portion 20 made of clear plastic to enable picture 18 underneath it to be visible. Belts 46 and 50 may be made of Mylar® or other suitable plastic materials. Film 24 may be made of Mylar or other suitable film materials that can be imprinted with pictures. Shafts 48 and 52, 62, etc. may be made of hard plastic, fiberglass or metals. Virtually any suitable material or combination of materials may be used to fulfill intended functionality of the various components within the broad scope of the embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is imperative to note that countless possible design configurations can be used to achieve the operational objectives outlined here. Accordingly, the associated infrastructure of system 10 may have a myriad of substitute arrangements, design choices, device possibilities, hardware configurations, equipment options, etc. It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to a mobile phone, system 10 may be applicable to other devices where a similar functionality may be desired.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising: a motor; a first endless belt encircling a first pair of spaced apart shafts; a second endless belt encircling a second pair of spaced apart shafts; a drive element connecting the motor to one shaft each of the first pair of shafts and the second pair of shafts; and a continuous strip of film comprising of a plurality of pictures imprinted thereon, having a first end and a second end attached to the first endless belt and the second endless belt respectively, wherein the film is wound around the belts, wherein the motor activates the drive element to rotate one shaft each of the first pair of shafts and the second pair of shafts causing the belts to rotate, unwinding the film from the first endless belt and winding it on the second endless belt; a power source to power at least the motor.

2. The apparatus of claim 1, being located within a mobile phone case comprising: a case top having a transparent portion sized to display a single picture on the film; a case bottom configured to fit a mobile phone; a printed circuit board configured to enable a wireless controller and a bar code sensor; and wherein the power source further comprises a battery.

3. The apparatus of claim 2, wherein the battery is charged through a micro-universal serial bus (USB) port on the mobile phone case.

4. The apparatus of claim 2, wherein each picture is identified by a bar code at a corresponding location of the film.

5. The apparatus of claim 4, further comprising the bar code sensor configured to read the bar code.

6. The apparatus of claim 2, further comprising the wireless controller configured to activate and deactivate the motor according to instructions from an application executing on the mobile phone that specify a selected picture on the film to be placed for display through the transparent portion of the case top.

7. The apparatus of claim 6, wherein the motor is activated to rotate the shafts to cause the belts to rotate, pulling the film with the pictures imprinted thereon, wherein the motor is stopped when the selected picture is located at the transparent portion of the case top.

8. The apparatus of claim 1, wherein the drive element comprises a gear drive.

9. The apparatus of claim 1, wherein the drive element comprises a friction belt drive.

10. The apparatus of claim 1, wherein the belts comprise teeth configured to mesh with corresponding teeth on the shafts forming a toothed belt drive.

11. The apparatus of claim 1, wherein each belt comprises a plurality of holes shaped to fit a corresponding plurality of teeth on the shafts, wherein when the shafts rotate, the teeth pull the belt by the holes, causing rotation of the belt.

12. The apparatus of claim 11, wherein the teeth are spaced apart at a pitch on each shaft, each tooth being located at an angle greater than zero relative to an adjacent tooth on the shaft.

* * * * *